Sept. 8, 1970 H. FRANZ ET AL 3,527,972
FULL WAVE RECTIFIER ASSEMBLY, PARTICULARLY FOR COMBINATION
WITH AUTOMOTIVE TYPE ALTERNATORS
Filed Oct. 9, 1968 6 Sheets-Sheet 1

INVENTORS
Herbert FRANZ, Gerhard HAUG
Friedhelm MEYER, Frithjof WERNER
Kurt STRAIF, Richard STEIMER
Johannes SAYER, Hans REICHELT

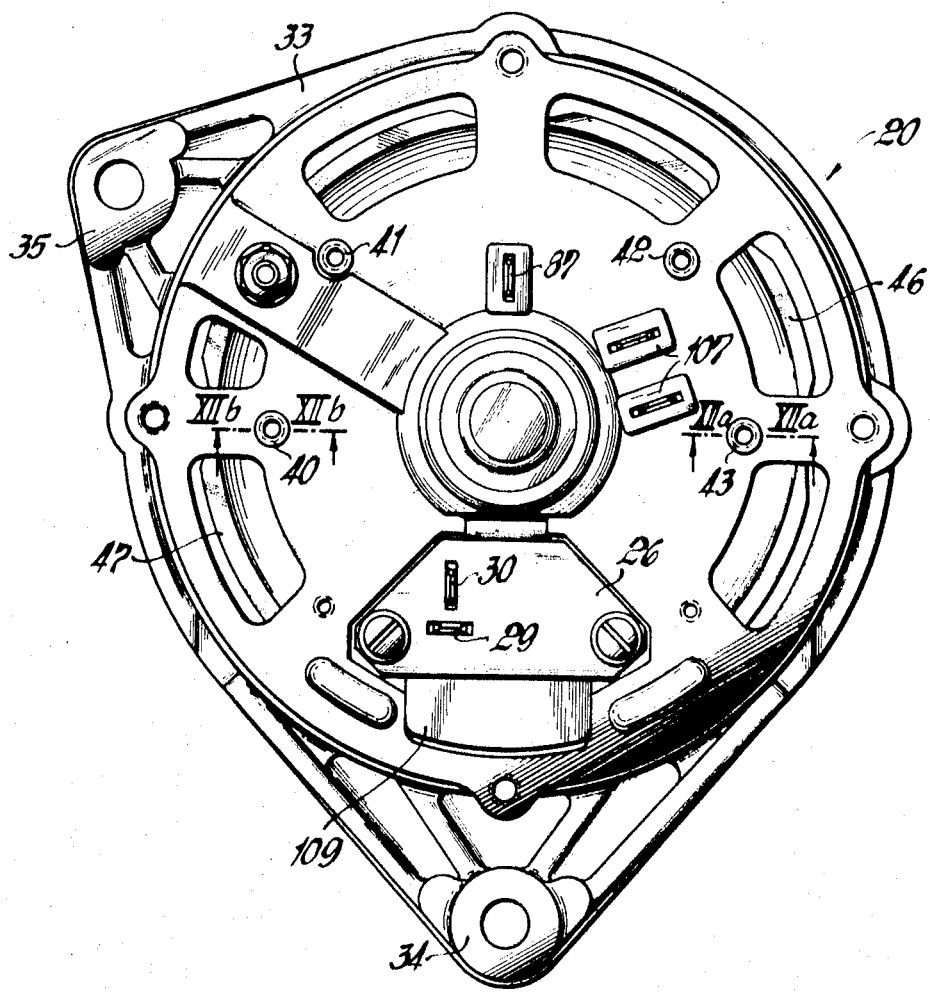

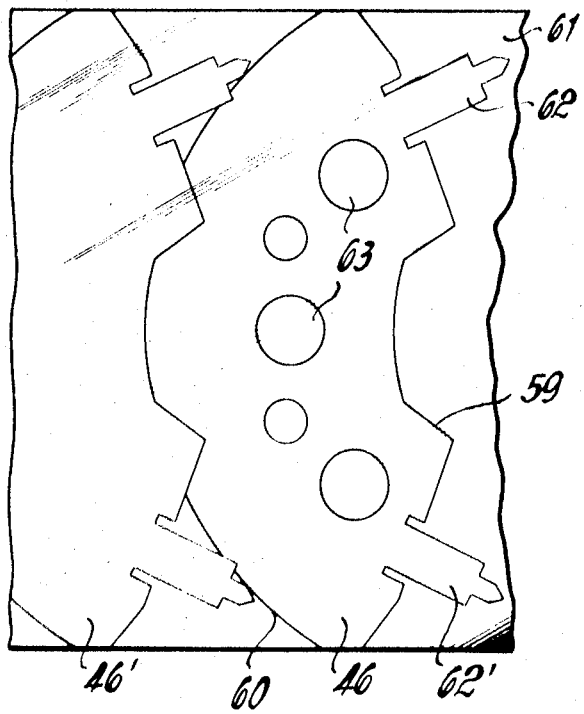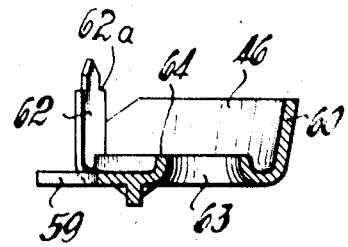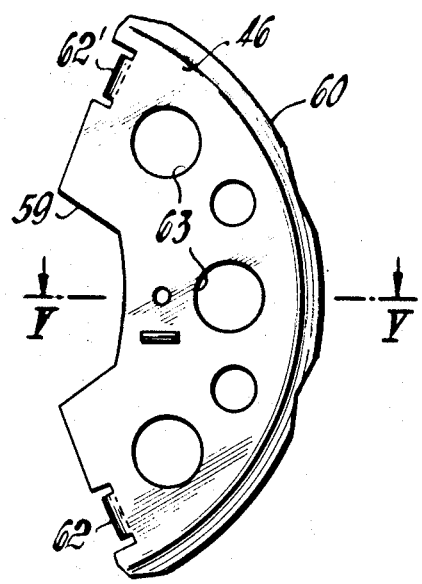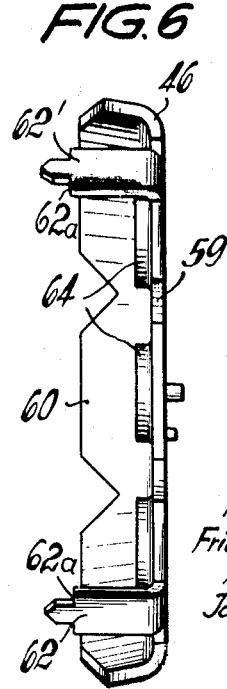

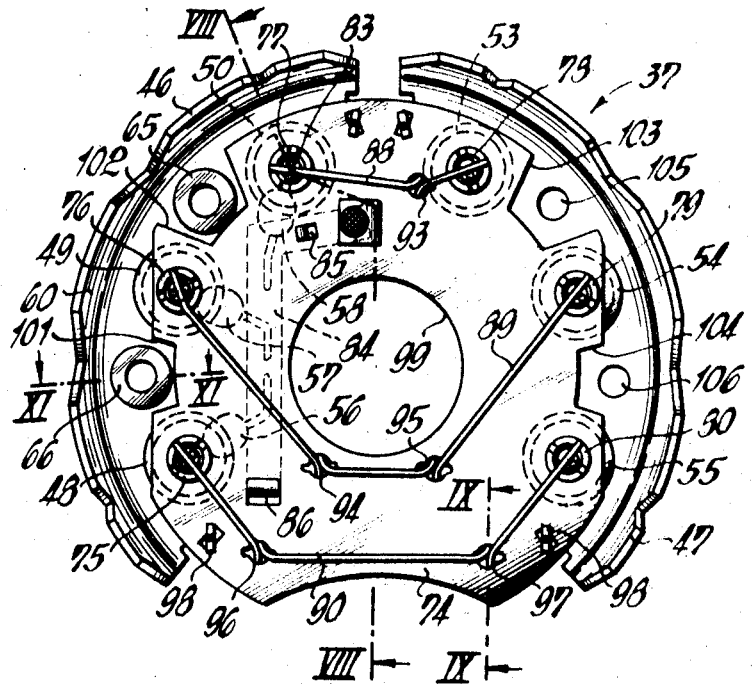
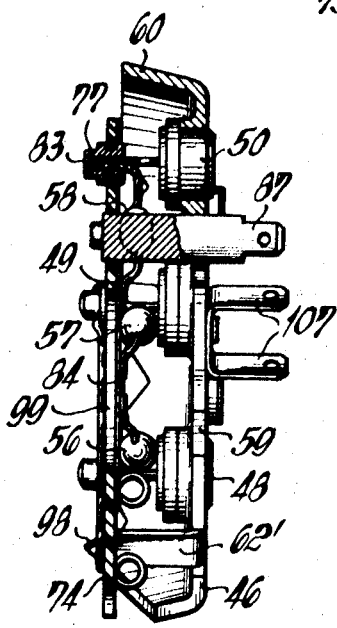
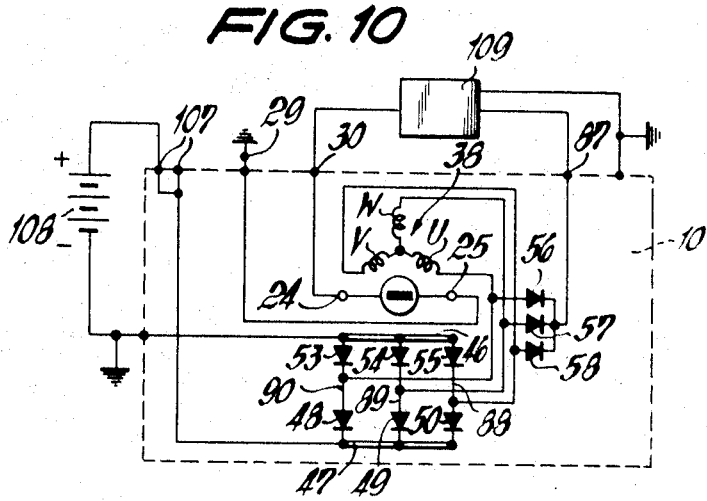
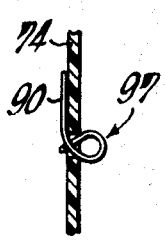

Sept. 8, 1970  H. FRANZ ET AL  3,527,972
FULL WAVE RECTIFIER ASSEMBLY, PARTICULARLY FOR COMBINATION
WITH AUTOMOTIVE TYPE ALTERNATORS
Filed Oct. 9, 1968  6 Sheets-Sheet 5

INVENTORS
Herbert FRANZ, Gerhard HAUK
Friedhelm MEYER, Frithjof WERNER
Kurt STRAIF, Richard STEIMER
Johannes SAYER, Hans REICHELT INVENTORS
Herbert FRANZ, Gerhard HAUG
Friedhelm MEYER, Frithjof WERNER
Kurt STRAIF, Richard STEIMER
Johannes SAYER, Hans REICHELT United States Patent Office 3,527,972
Patented Sept. 8, 1970

3,527,972
FULL WAVE RECTIFIER ASSEMBLY, PARTICULARLY FOR COMBINATION WITH AUTOMOTIVE TYPE ALTERNATORS
Herbert Franz, Stuttgart, Gerhard Haug, Waiblingen, Friedhelm Meyer, Gerlingen, Frithjof Werner, Stuttgart-Zuffenhausen, Kurt Straif, Stuttgart-Fasanenhof, Richard Steimer, Denkendorf, Johannes Sayer, Stuttgart-Bad, and Hans Reichelt, Stuttgart, Germany, assignors to Robert Bosch GmbH., Stuttgart, Germany, a limited-liability company of Germany
Filed Oct. 9, 1968, Ser. No. 766,173
Claims priority, application Germany, Nov. 18, 1967, 1,613,040
Int. Cl. H02k 11/00
U.S. Cl. 310—68
25 Claims

ABSTRACT OF THE DISCLOSURE

A pair of sheet metal strips of circular sector shape are mounted, one of them insulated, on the end bell of an automotive type alternator. The rectifier diodes being pressed into holes in the strips, and a parallel ring plate is secured to the strips, and formed with eyelets through which terminal wires of the rectifier diodes extend the eyelets and other mounting points holding interconnection wires to form a complete alternator-rectifier assembly and terminal board for the alternator. The assembly fitting about the shaft of the alternator preferably in the region of the slip rings thereof, exposed to alternator cooling air, requiring little additional space and economical to manufacture and assembly.

---

The present invention relates to a rectifier assembly and more particularly to a rectifier assembly to be combined with a three-phase automotive type alternator, so as to form a complete alternator-rectifier combination therewith.

Rectifier assemblies in which connecting lines to the rectifier diodes are embedded in an insulating block so that the lines will be essentially semi-circular, for combination with an automotive type alternator, are known (see, for example, British patent specification 1,056,554). The connecting lines are formed as a printed circuit, and connect with the various diodes and the cooling bodies or heat sinks therefor.

It is an object of the present invention to improve a rectifier diode assembly for use with automotive type alternators, and to decrease the cost of manufacture and assembly of the parts and the entire rectifier-alternator combination.

SUBJECT MATTER OF THE PRESENT INVENTION

Briefly, a pair of sheet metal strips are provided formed at openings to receive rectifier diodes; an insulating plate is located substantially parallel and spaced from the strips and has eyelets of conducting material inserted therein. One of the connection leads from the diodes, forming one terminal, is secured to the eyelets, the other terminal of the diodes being in electrical connection with a respective one of the metal strips. Circuit interconnections are then secured to the eyelets of the insulating plate, to which also output windings of the alternator can be connected, so that an integrated complete alternator-rectifier assembly is formed, which is particularly suitable for automatic placement of circuit elements, assembly, and dip soldering, thus greatly simplifying automatic manufacture.

The metal strips are preferably so formed that they have a bent-over edge flange. By making the metal strips in the form of circular sectors, waste in production can be avoided since the outer edge of one sector may, at the same time, be the inner edge of an adjacent one, the sectors all being punched successively from a long strip of material. The outer edge of the formed, semi-circular sector strips may have notches, which simplify the formation of the edges to form a bent-over flange.

The structure, organization and operation of the invention will now be described more specifically with reference to the acccompanying drawings, wherein:

FIG. 2 is a section along line II—II of FIG. 1;

FIG. 3 is a top view of a metal strip from which sector-strips can be punched out, indicating the punching-out line;

FIG. 4 is a top view of a punched, formed sector strip, without rectifier diodes;

FIG. 5 is a sectional view along line V—V of FIG. 4;

FIG. 6 is a side view of the semi-circular sector of FIG. 4;

FIG. 7 is an end view of the rectifier assembly ready for insertion into the alternator of FIG. 1;

FIG. 8 is a sectional view along line VIII—VIII of FIG. 7;

FIG. 9 is a detailed view of a wire support point along line IX—IX of FIG. 7;

FIG. 10 is an electrical circuit diagram of an automotive alternator-rectifier type supply;

Figure 1:
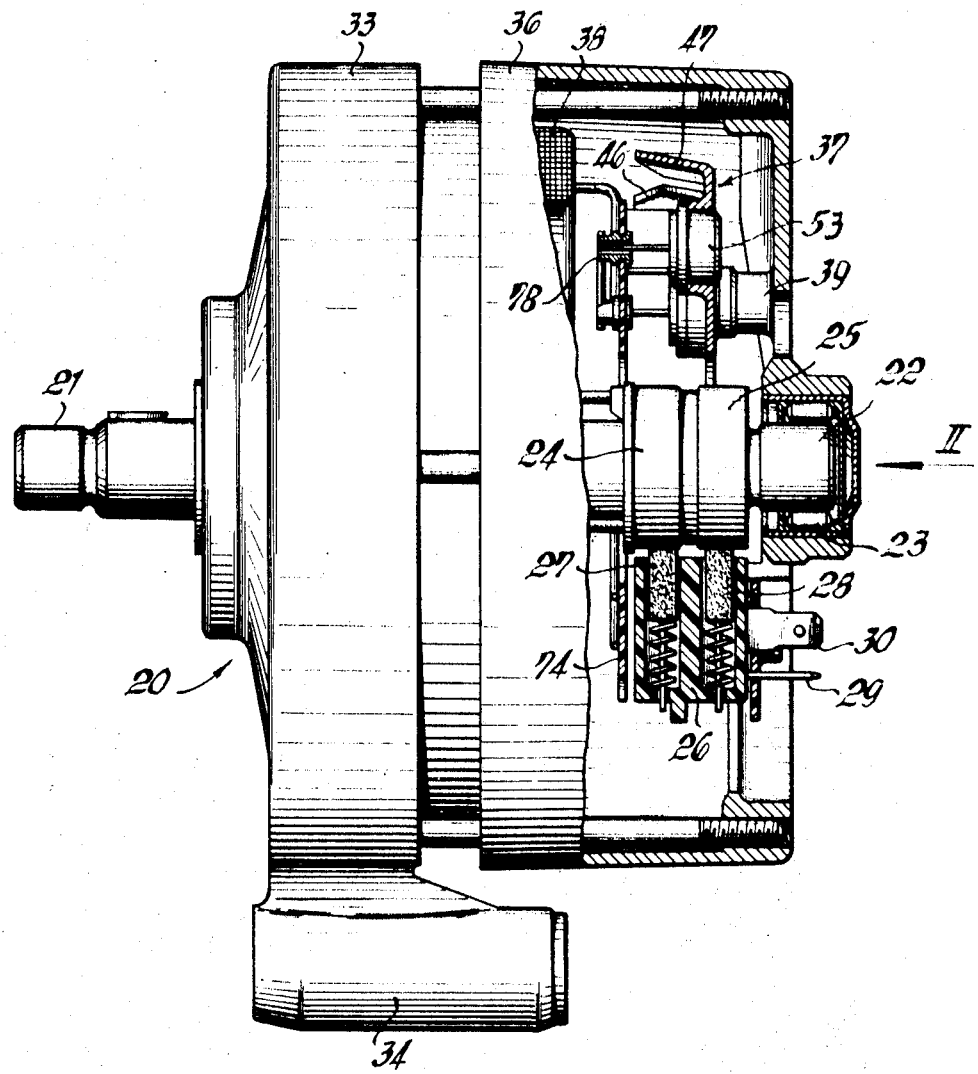
FIG. 1 is a side view, partly in section, of an automotive type alternator with rectifier assemblies mounted therein.

Referring now to the drawings and more particularly to FIG. 1: Salient pole alternator 20 has a shaft 21, driven for example by an automotive internal combustion engine. Needle bearing 23 retains shaft 22 in a housing and end bell 36. A pair of slip rings 24, 25 provide electrical current to the field winding secured to shaft 21. A pair of brushes 27, 28, secured in a brush holder 26, and connected to field terminal flags 29, 30, supply electrical current to the field winding. Terminals 29, 30, are similarly indicated as electrical terminals in FIG. 10, illustrating the entire generator-rectifier circuit for use in an automotive electrical supply.

Figure 12A:
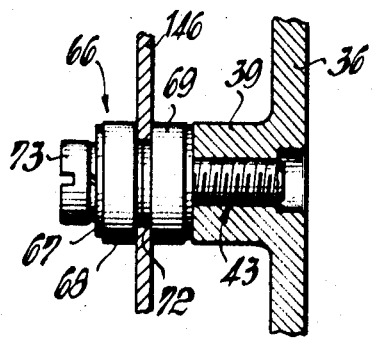
FIGS. 12a and 12b are side views, partly in cross section, of the mounting arrangement for the semi-circular strips in the end bell of the alternator, both to the same scale, FIG. 12a illustrating an insulated mounting.
Figure 12B:
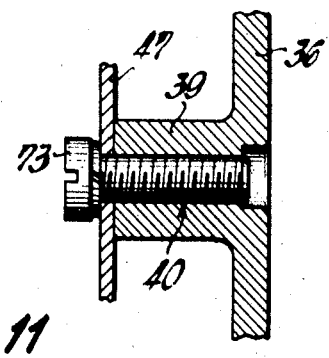

The end bell 33, adjacent the projecting shaft end is formed with a pair of mounting brackets 34, 35, as well known; the opposite end bell 36 supports a rectifier assembly 37 to rectify the three-phase output derived from stator winding 38 of generator 20. End bell 36 is provided with four projecting bosses 39, to which rectifier assembly 37 is secured by screws. One of these bosses is seen in FIG. 1. Each one of bosses 39 has an internal thread 40, 41, 42, 43 (FIG. 2). The bosses having threads 40, 41, are slightly longer than boss 39 with its bore 42, and the boss carrying bore 43. FIGS. 12a and 12b illustrate, in cross-sectional view, threads 43 and 40. These figures are drawn to the same scale so that the differences will be clearly apparent.

Referring now to FIGS. 3 to 8: Rectifier assembly 37 is composed of a pair of sheet metal strips 46 to act as cooling strips and heat sinks for rectifier diodes. One of these strips, 46, is for diodes having their housing connected to the positive terminal, the other strip 47, being for diodes having a negative housing. Cooling strip 47 can then be connected electrically directly to end bell 36, whereas cooling strip 46 is connected to the end bell 36 by means of insulated bushings. Cooling strip 46 mounts, and cools three semi-conductor diodes, 48, 49, 50, which may be referred to as positive diodes; cooling strip 47 cools three semi-conductor diodes, 53, 54, 55, which may be referred to as negative diodes. Additionally, three semi-conductor diodes, 56, 57, 58 (FIG. 8) are provided to supply field current which may be termed exciter diodes.

The cooling and mounting strips 46, 47, are readily made from a long strip of sheet metal 61 (FIG. 3). Each cooling body 46 in general is in the form of a circular sector, and, during manufacture, can be so arranged on the strip 50 that the outer edge 60 of a cooling strip 46 matches the inner edge 59 of an adjacent cooling strip 46'. The cooling strips can thus be punched with very little waste and subsequent shaping and working to form the strips to the proper shape is facilitated. Suitable openings can be punched into the strip blanks 46, 46', of FIG. 3 simultaneously with punching out the strips. Each one of the strip blanks, in addition to the semi-circular sector shape is formed with a pair of projecting end strips 62, 62'.

The first step of manufacturing the cooling body strip is thus that of punching out a flat strip in the shape shown in FIG. 3. Thereafter, end strips 62, 62' are bent over at 90° (FIG. 5), the openings 63 to receive diodes for rectification are necked, and the outer edge 60 is pressed to have a collar as clearly appears in FIGS. 5 and 6. The entire cooling and support body 46 will thus have substantial stiffness and be stable against deformation and twist, and will be resistant to vibration and will not be subject to resonant oscillations.

Figure 11:
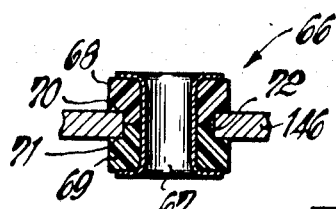
FIG. 11 is a detailed view of a mounting point, in cross section, along lines XI—XI of FIG. 7.

The various diodes are pressed into openings 63, as seen best in connection with diode 50 (FIG. 8). A pair of insulators 65, 66, are inserted into strip body 46, insulator 66 being seen in cross-section in FIG. 11. The insulator consists of a pair of hollow cylindrical insulating bushings, 68, 69, each formed with a ring-shaped recess 70, 71 at their inner end, held together by a hollow rivet 67, for example of brass. Slit 46 fits within the shoulders formed by ring-shaped recesses 70, 71. To assemble the insulator, a bushing 68, 69, each is inserted from opposite sides through a hole 72 of body 46, hollow rivet 67 is then inserted and eyeletted over.

The cooling and mounting strips 46, 47, are connected to the end bell as seen in FIGS. 12a, and 12b. As illustrated in FIG. 12a, a screw 73 is passed through hollow rivet 67, securing strip 46 to end bell 36 while maintaining electrical insulation. This mounting arrangement is simple and rapid. FIG. 12b illustrates mounting of the negative cooling strip 47 on the boss 39 of end bell 36, also by means of a screw 73. Since the complete rectifier assembly can be mounted as a manufactured unit, no additional insulation for the plus rectifier strip and assembly 46 is necessary.

After cooling strips 46, 47 are made, and the various diodes have been inserted, an insulating plate 74 (see FIGS. 7 and 8) is mounted to the strips 46, 47. Plate 74 is formed with six eyelets 75–80, which are aligned with the center of the holes into which the diodes are inserted. Rectifier diodes for particular use in the assembly of the present invention have a central terminal lead, which will then register with the eyelets 75–80.

When plate 74 is assembled to strips 46, 47, then the eyelets will be directly opposite the terminal pins of the diodes, as seen in cross-section in FIG. 8 in connection with terminal 83 of plus diode 50. In addition, a connecting wire of exciter diode 58 is inserted into the eyelet 77, the other terminal of which is welded, or brazed to a metal strip 84, for example in the shape of a "L," which is secured to plate 74 by a pair of bent-over claws 85, 86, and electrically connected with a connection flag 87. Metal strip 84 is further connected to one of the terminals of diodes 56, 57, the other terminal of which extends into eyelets 75 and 76.

Three electrical interconnections, in form of wires 88, 89, 90, are secured to plate 74. Wire 88 interconnects elemets 77 and 78 and extends over a mounted point 93. As best seen in FIG. 10 a cathode of a plus diode 50 is interconnected with the anode of a minus diode 55 by means of wire 88. When connected to the generator, phase V of three-phase winding 38 likewise connects thereto.

Similarly, wire 89 interconnects elements 76 and 79 of phase W, and is secured by a pair of support points 94, 95. Wire 90 interconnects elements 75 and 80 with phase U of winding 38 and is connected to a pair of support points 96, 97.

FIG. 9 is a cross-sectional view illustrating in detail a simple and rapid mounting arrangement for a support point 97. A longitudinal slit (when seen in plan view) is formed in plate 74, having a circular hole in the middle. Wire 90 is formed into a small loop, inserted through the longitudinal slit so that the loop extends to the other side of plate 74 and then, as seen in FIG. 9, the loop extending to the other side is twisted by 90° so that it will extend transverse to the longitudinal slit and positively secure to the plate. This manufacturing step can be done automatically by machinery.

The projecting strips 62, 62' (FIGS. 5 and 6) have points at their ends, which extend through suitable openings in plate 74, where they are formed, for example by twisting or riveting, as seen in FIG. 7 at 98. The shoulders 62a, as seen in FIGS. 5 and 6, determine the distance of plate 74 from cooling strips 46, 47, and simultaneously secure the plates in position. The connection leads of diodes 48 to 50, and 53 to 55, inserted into eyelets 75 to 80 additionally secure strips 46, 47 and plate 74 together.

Plate 74 is formed with a central opening 99 (FIG. 7) through which shaft 21 and slip rings 24, 25 may pass. Plate 74 is thus essentially a circular ring which provides for excellent stability. Additionally, plate 74 is formed at its outer edge with four notches, 101, 102, 103, 104. Notches 101, 102 are aligned with insulator 65, 66, and notches 103, 104 with openings 105, 106 in the minus-cooling strip 47 which, in turn, are aligned with threads 40, 41 in the end bell of the generator. Notches 101 to 104 facilitate mounting of the rectifier assembly 37 within generator 20 to provide ready accessibility of the mounting screws.

A U-shaped terminal 107 (FIG. 8) is connected to the positive strip 46, for example by riveting, for connection to a battery 108 (FIG. 10) and a load circuit. A voltage regulator 109 is connected between terminals 30 and 87. Voltage regulator 109 may be a transistor regulator mounted adjacent the brush holder 26 (FIG. 2).

Figure 17:
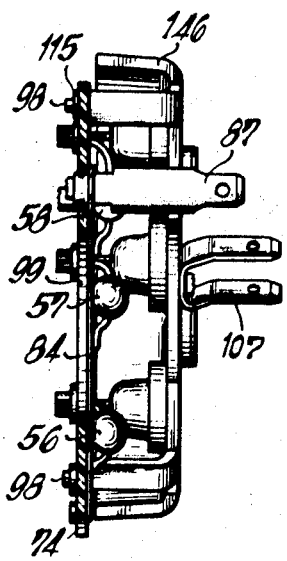
FIG. 17 is a top view of a rectifier assembly made with the metal cooling strips of FIG. 14.
Figure 18:
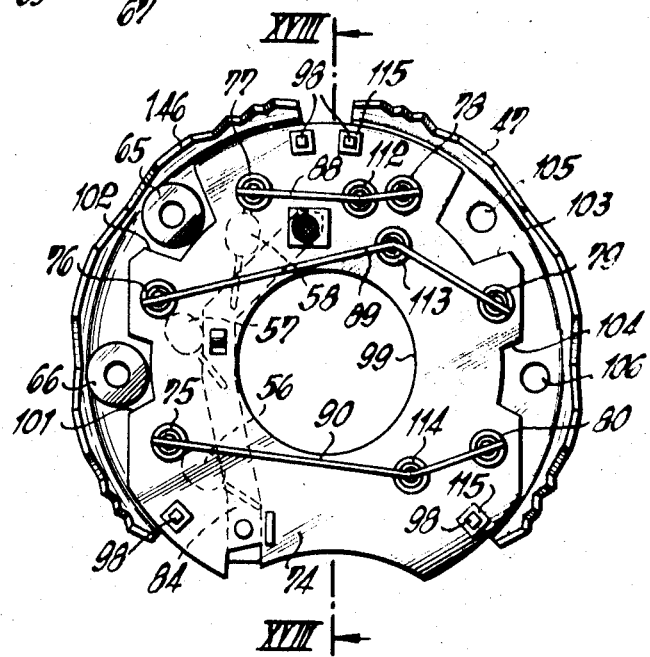
FIG. 18 is a cross-sectional view along line XVIII—XVIII of FIG. 17.
Figure 13:
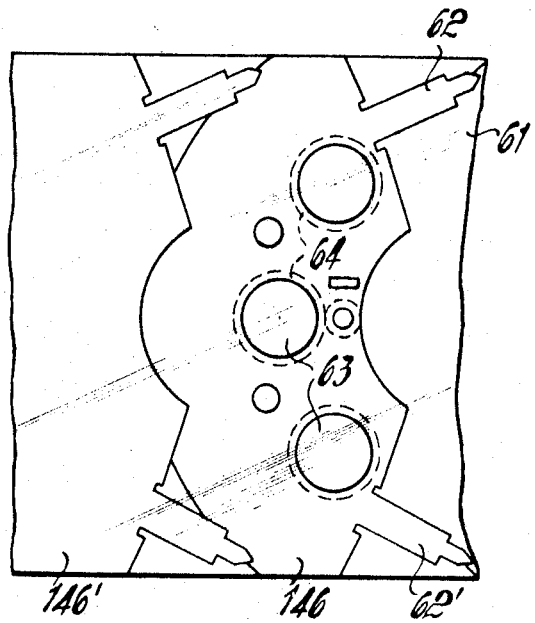
FIG. 13 is a top view of a metal strip from which semi-circular holding plates, of a different embodiment from that of FIG. 4 may be made.

A second embodiment of the rectifier assembly is illustrated in FIGS. 13 to 18; the main difference between the embodiment of FIGS. 13 and 18 and that previously described is the form of the cooling strips and the mounting of the interconnecting wires on the insulating plate. Similar parts in the drawings will have the same reference numerals and will not be further described.

Figure 16:
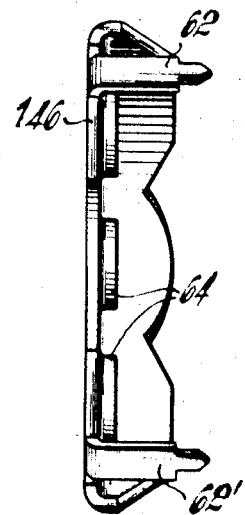
FIG. 16 is a side view of the metal strip of FIG. 14.
Figure 14:
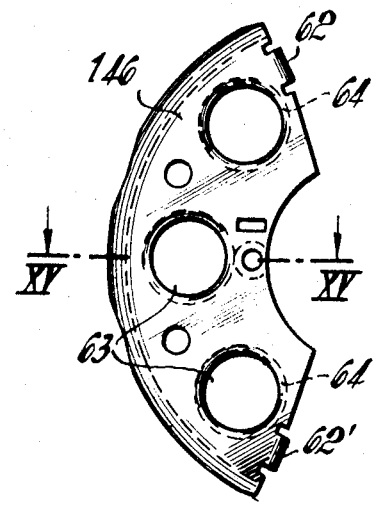
FIG. 14 is a top view of the finished semi-circular plate of FIG. 13.
Figure 15:
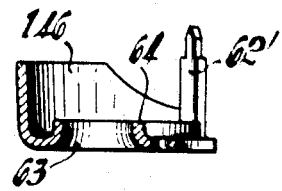
FIG. 15 is a cross-sectional view along line XV—XV of FIG. 14.

The cooling strips 146, 146' are essentially similar to cooling strips 46, 46' previously described, except that the outer edge of the cooling strips in the region where they are bent over at their outer side is scalloped, as best seen in FIG. 16. FIG. 17 illustrates the arrangement of wires 88, 89, 90 on plate 74. Three further eyelets 112, 113, 114, are provided as connection and support points, the eyelets having longitudinal slits through which an associated wire connects. Eyelets 112, 113, 114 simultaneously serve as connection terminals for phases U, V, and W of winding 38 and are soldered as one unit when the connection lines from the stator of the generator windings have been mechanically assembled. The other eyelets 75–80 are soldered first, that is before final assembly, so that wires 88, 89, 90 are secured to plate 74. The points of connecting strips 62, 62' are riveted over as seen at 98, FIG. 17; a back-up plate 115 is located beneath the headed point.

Sheet metal strips 46, 47, shaped and made as previously disclosed in accordance with the present invention, form an efficient cooling and support surface, utilizing little material and providing large cooling surface, are easy to be connected into a generator assembly and can be readily replaced in case of malfunction or damage to one or more of the diodes. Automatic manufacture of the cooling strips, and automatic insertion of the electrical element is readily possible, so that a minimum of hand-assembly in the manufacture of a complete alternator-rectifier combination is needed.

To provide for a compact assembly, the circular plate 74 is preferably of slightly smaller diameter than the sector-shaped strips after the flanged collar is bent up. The flanged collar, itself, is slightly more shallow than the length of the holding strips 62, 62', as clearly appears in FIGS. 5 and 16. The shoulders 62a are slightly higher than the depth of the flange, so that plate 74 will be spaced from the flange by a slightly greater distance than the depth of the flange, to provide for free circulation of cooling air. The entire assembly can be mounted in such a manner that it substantially surrounds the slip ring assembly of the alternator, as best seen in FIG. 1, so that no additional longitudinal space is needed within the alternator itself, while still providing an integrated, unitary alternator-rectifier assembly which is compact. By placing a transistor-type voltage regulator, as seen in FIG. 2, in the space between the sectors, the entire electrical rectifier, as well as control system for an automotive vehicle, can be accommodated in the space required for the alternator itself, and further having excellent cooling since the cooling air drawn into the alternator will pass by the rectifier assembly as well as the voltage regulator.

The present invention has been described in connection with an automotive type alternator-rectifier assembly. Various structural changes and modifications, as determined by the requirements of particular applications or uses, may be made without departing from the inventive concept.

What is claimed is:

1. Full wave rectifier assembly having a plurality of rectifier diodes having a conductive housing and a projecting connecting pin, said diodes rectifying A-C power supply and providing a direct current output, said assembly comprising a pair of cooling strips (46, 47) of sheet metal stampings formed with openings therein, each of the strips receiving the housings of said diodes (48, 49, 50; 53, 54, 55) in said openings, the housings of the diodes of one strip being of a polarity opposite to the housings of the diodes in the other strip;

a plate (74) of insulating material located substantially parallel to and spaced from said cooling strips (46, 47) and formed with openings therethrough;

eyelets (75–80) of conducting material inserted in the openings of said insulating plate, the connecting pins of said diodes extending into and being secured to said eyelets;

and circuit interconnections (88, 89, 90) electrically connected to and mechanicaly secured to said eyelets.

2. Assembly according to claim 1, wherein said sheet metal stamping cooling strips are formed with elongated projecting holding strips (62, 62') bent at right angles with respect to the plane of said strips, said holding strips securing said insulating plate (74) in spaced, substantially parallel relation to said cooling strips.

3. Assembly according to claim 2, wherein said holding strips (62, 62') have an end portion of reduced size, openings formed in said insulating plate (74) dimensioned to receive said end portions, said end portions being deformed (98, 198) to secure said plate (74) and said cooling strips together.

4. Assembly according to claim 3 wherein the end portions extending beyond the plate (74) are twisted (FIG. 7) to secure the plate (74) and said cooling strips (46, 47) together and form a unitary assembly.

5. Assembly according to claim 3 wherein the end portions extending beyond the plate (74) are riveted to secure the plate (74) and said cooling strips (46, 47) together and form a unitary assembly.

6. Assembly according to claim 2 wherein each cooling strip has at least two of said elongated holding strips (62, 62'), said holding strips, and said connection leads from said diodes mechanically securing said strips (46, 47) and said plate (74) together to hold said plate in spaced, substantially parallel relation.

7. Assembly according to claim 1 wherein said metal strips (46, 47) are sectors of circular rings, the inner edge of one ring defining the outer edge of another adjacent strip, the outer edge being formed with cutouts at their circumference where the radial end lines defining the sectors meet the inner edge of an adjacent strip.

8. Assembly according to claim 7 wherein the outer edges of said strips forming a circular sector are bent at substantially right angles to the plane of said strips to provide a collar flange, the cutouts at the outer edges permitting bending-over of the flange along the circular outer edge.

9. Assembly according to claim 7 wherein said plate (74) has a substantially circular outline and is of slightly smaller diameter than the diameter of the circular ring.

10. Assembly according to claim 9 wherein the outer edges of said strips are formed with a bent-over flange extending toward said plate, said strips being formed with bent-over holding strips (62, 62') longer than the extent of said flange, said holding strips securing said plate and said cooling strips in spaced relation with the spacing of said plate from said strip being slightly greater than the length of said flange.

11. Assembly as claimed in claim 1 wherein two groups of diodes are provided having their housings of opposite polarity, and said circuit interconnections are formed by wires extending along said plate (74) and interconnecting the terminals of said diodes not formed by their housing.

12. Assembly according to claim 11, wherein said plate is formed with openings (93–97) said wires being bent into a loop, said loops being inserted into said openings to hold and secure said wires to said plate (FIG. 9).

13. Assembly according to claim 12, wherein said openings are elongated and slightly wider than the thickness of the wire, said loops, after insertion in said openings being twisted to secure said loops to said plate.

14. Assembly according to claim 12, wherein said openings are formed to provide a circular hole and a transversely extending elongated slot of greater length than the diameter of the hole.

15. Assembly according to claim 11 including a flag terminal secured to said plate and forming a support point for at least one of said wires.

16. Assembly according to claim 11 wherein said wires are located at the side of said plate opposite the side facing said cooling strips.

17. Assembly according to claim 1 to provide a rectifier assembly for an alternator, including at least one additional group of rectifiers (56, 57, 58), said additional group of rectifiers being secured to said plate (74) and providing direct current for the field circuit of said alternator.

18. Assembly according to claim 17 wherein said plate is formed with a pair of openings, and connection strip (84) inserted through said openings and crimped thereto (85, 86).

19. Assembly according to claim 1 in combination with an automotive type alternator having an end bell; mounting means formed on said bell;
and a hollow, insulated bushing (FIG. 11) mechanically interconnecting said sheet metal cooling strips at said mounting means to provide a unitary alternator-DC power supply assembly.

20. Assembly according to claim 19 wherein said plate (74) is notched (101, 102) in the region of said bushing to provide easy access for mounting and replacement, as a unit, of said cooling strips (46, 47) and plate (74) to said end bell.

21. Assembly according to claim 19 said alternator having slip rings, the plate having a circular hole larger than the diameter of said slip rings, said strips being circular sectors having an inner diameter larger than said slip rings;
said plate and strips being mounted in the end bell over said slip rings.

22. Automotive type alternator-rectifier assembly comprising an alternator having an end bell;
two sheet metal strips of circular sector outline located in the interior of one of said end bells, said sectors being formed with a central circular end and inwardly bent-over holding strips;
a circular, ring-shaped plate secured to said holding strips and having mounting slots formed therein, the central opening of said ring-shaped plate receiving, with clearance, the alternator shaft passing into the end bell;
a plurality of groups of rectifier diodes, at least two of said groups of rectifier diodes having as one terminal a conductive housing; openings formed in said sheet metal strips, said conductive housings of said diodes being inserted in said openings;
said inwardly bent holding strips being connected into some of said slots in said ring-shaped plate to secure said plate and strips together;
conductive eyelets formed in said plate;
said rectifier diodes being formed with a connecting lead, said connecting leads extending into and being secured to said eyelets;
interconnecting wires located against said plate at the side remote from said sheet metal strips and secured to said eyelets;
terminal flags to secure to said plate;
and interconnecting means from the windings of said alternator to said rectifier diodes and said strips and flags, said interconnecting means being mechanically secured to said plate;
and means securing one of said sheet metal strips of circular-sector shaped outline in insulated relation to said end bell and the other of said strips in conductive relation to said end bell, said plate being secured to both of said strips to provide a unitary alternator-rectifier assembly.

23. Assembly according to claim 22 wherein said metal strips, are sectors of circular rings, the inner edge of one ring defining the outer edge of an adjacent ring, the outer edge being formed with cutouts at their circumference where the radial end lines defining the sectors meet the inner edge or an adjacent strip;
the outer edges of said strips being formed with a bent-over flange extending towards said plate, said bent-over holding strips being longer than the depth of said flange and secured to said ring-shaped plate to secure said plate and strips together in substantially parallel spaced relation.

24. Assembly according to claim 22, said alternator having slip rings and a brush assembly for said slip rings, the central opening of said circular ring-shaped plate and the diameter of said inner edge of said sector-shaped sheet metal strips being larger than the diameter of said strip rings, said plate and strips assembly being mounted in the end bell of said alternator surrounding said slip rings and brush holder assembly.

25. Assembly according to claim 3, wherein said holding strips (62, 62') have a shoulder, the end portion of reduced size (98) extending beyond said shoulder and beyond said plate (74), said shoulder forming a bearing and support surface for said plate (74) of insulating material, the part of said end portion of reduced size extending beyond said plate being deformed to secure said plate (74) and said cooling strips (46, 47) together and form a unitary assembly.

References Cited

UNITED STATES PATENTS

| | | | |
|---|---|---|---|
| 3,041,484 | 7/1962 | Freer | 310—68.4 |
| 3,198,972 | 8/1965 | Larson | 310—68 |
| 3,250,928 | 5/1966 | Bates | 310—68 |
| 3,329,840 | 7/1967 | Binder | 310—68 |
| 3,329,841 | 7/1967 | Binder | 310—68 |

MILTON O. HIRSHFIELD, Primary Examiner

R. SKUDY, Assistant Examiner

U.S. Cl. X.R.

310—52, 71, 91, 158, 232, 239